United States Patent
Jones, IV et al.

(10) Patent No.: US 6,611,551 B1
(45) Date of Patent: Aug. 26, 2003

(54) OFDM CHANNEL IDENTIFICATION

(75) Inventors: Vincent K. Jones, IV, Redwood Shores, CA (US); David Pignatelli, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/234,929

(22) Filed: Jan. 21, 1999

(51) Int. Cl.[7] .............................. H03B 1/38; H03B 3/00
(52) U.S. Cl. ..................... 375/219; 375/346; 370/210
(58) Field of Search ......................... 375/219, 222, 375/231, 232, 260, 340, 346, 348; 370/203, 206, 208, 210; 708/403, 404

(56) References Cited

U.S. PATENT DOCUMENTS

| | | | |
|---|---|---|---|
| 5,285,474 A | * 2/1994 | Chow et al. ............... | 375/231 |
| 5,636,246 A | * 6/1997 | Tzannes et al. ............ | 375/260 |
| 5,751,766 A | 5/1998 | Kletsky et al. ............ | 375/224 |
| 6,185,251 B1 | * 2/2001 | Fertner .................... | 375/231 |
| 6,192,026 B1 | * 2/2001 | Pollack et al. ............ | 370/203 |
| 6,289,045 B1 | * 9/2001 | Hasegawa et al. .......... | 375/231 |
| 6,298,035 B1 | * 10/2001 | Heiskala .................. | 370/206 |
| 6,307,889 B1 | * 10/2001 | Chun ...................... | 375/260 |
| 6,320,901 B1 | * 11/2001 | Arad et al. ............... | 375/222 |

FOREIGN PATENT DOCUMENTS

| EP | 1 056 250 A2 | * 11/2000 | |
|---|---|---|---|
| WO | WO 98/09385 | 3/1998 | ............ H04B/7/02 |

* cited by examiner

*Primary Examiner*—Young T. Tse
(74) *Attorney, Agent, or Firm*—Ritter, Lang & Kaplan LLP

(57) ABSTRACT

A system and method for characterizing a channel used by a digital communication system. In an OFDM system, the number of training symbols used to characterize a channel may be decreased by taking advantage of knowledge of certain channel components, e.g., transmitter and/or receiver digital filters. The number of training symbols used may be less than v, the duration of the impulse response of the overall channel.

40 Claims, 2 Drawing Sheets

OFDM CHANNEL IDENTIFICATION

STATEMENT OF RELATED APPLICATIONS

This application relates to the subject matter of U.S. application Ser. No. 08/921,633 filed Aug. 27, 1997, now U.S. Pat. No. 6,144,711, entitled SPATIO-TEMPORAL PROCESSING FOR COMMUNICATION, the contents of which are herein incorporated by reference.

BACKGROUND OF THE INVENTION

The present invention relates to digital communication and more particularly to evaluating channel characteristics.

In digital communication systems, it is often desirable to characterize the channel used for transmitting data from a transmitter to a receiver. The receiver and/or the transmitter may improve communications performance by performing signal processing that requires knowledge of the channel. Particularly in mobile channels, and often in fixed channels, channel characteristics will vary over time and taking advantage of knowledge of channel characteristics requires repeated measurements.

OFDM (Orthogonal Frequency Division Multiplexing) is a desirable modulation scheme for digital communication. In an OFDM transmitter, the inverse Fast Fourier Transform (IFFT) is applied to a burst of N frequency domain symbols to obtain a burst of N time domain symbols. The last v symbols in the time domain are then affixed to the beginning of the time domain burst as a cyclic prefix, increasing the length of the time domain sequence to N+v. The resulting complex digital time-domain sequence is converted to in-phase (I) and quadrature (Q) analog signals that are used to quadrature-modulate an RF carrier. The RF carrier is then radiated from a transmitter antenna.

At the receiver, the signal is captured by another antenna and downconverted into I and Q baseband analog waveforms, that are then converted to digital representations with analog-to-digital converters. The cyclic prefix is removed and the remaining N received time domain symbols are converted to the frequency domain by applying a Fast Fourier Transform (FFT).

Each frequency domain symbol in the burst input to the IFFT can be viewed as corresponding to a different orthogonal narrowband subcarrier. Each subcarrier is low data rate as compared to the burst as a whole. Since the symbol periods are therefore very long, intersymbol interference as would be caused by multipath effects is greatly ameliorated.

Even greater increases in the performance of OFDM systems are possible if the channel characteristics are known. For example, so-called "vector coding" techniques may be applied to effectively remove frequency selective effects imposed by the channel. Further highly advantageous spatial processing techniques take advantage of the use of multiple antennas or multiple antenna polarizations at the transmitter and/or receiver. See WO 98/09385, the contents of which are herein incorporated by reference. In the context of such spatial processing it is useful to know the characteristics of a channel which couples a combination of transmitter antenna and receiver antenna.

One way of learning channel characteristics in an OFDM system is to force some of the symbols input to the IFFT to predetermined values. These symbols are then referred to as training symbols. At the receiver end, the channel can be characterized by its effect on the training symbols whose ideal values are known to both transmitter and receiver. Symbols used for training are, however, then unavailable to carry data, reducing system efficiency, particularly in systems where channel characteristics change rapidly enough to require frequent updates or even retraining with every burst.

It has been found that a complete characterization of the frequency response does not require use of a training symbol at each subcarrier frequency. In fact, it is sufficient to use v training symbols within a single burst where v represents the impulse response duration of the overall channel including transmitter and receiver components as well as the propagation medium. To increase data transmission capacity, it would be desirable to decrease the number of training symbols used even further.

SUMMARY OF THE INVENTION

The present invention provides a system and method for characterizing a channel used by a digital communication system. In an OFDM system, the number of training symbols used to characterize a channel may be decreased by taking advantage of knowledge of certain channel components, e.g., transmitter and/or receiver digital filters. The number of training symbols used may be less than v, the duration of the impulse response of the overall channel.

According to a first aspect of the present invention, a method for characterizing a channel having known and unknown components includes: receiving a time domain series of symbols via said channel, converting said time domain series of symbols into a series of frequency domain symbols including $\mu$ training symbols wherein $\mu$ is less than a duration of an impulse response of said channel but not less than an impulse response of said unknown component of said channel, and processing said training symbols to characterize said unknown components of said channel.

A further understanding of the nature and advantages of the inventions herein may be realized by reference to the remaining portions of the specification and the attached drawings.

DESCRIPTION OF SPECIFIC EMBODIMENTS

OFDM Communication System

In one embodiment, the present invention may implemented in the context of an OFDM communication system. The abbreviation "OFDM" refers to Orthogonal Frequency Division Multiplexing. In OFDM, the available bandwidth is effectively divided into a plurality of subchannels that are orthogonal in the frequency domain. During a given period; a symbol period, the transmitter transmits a symbol in each subchannel. To create the transmitted time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \rightarrow [z(N-v+1) \ldots z(N) \, z(1) \, z(N)]^T$$

On the receive end, the cyclic prefix is removed from the received time domain symbols. An FFT is then applied to recover the simultaneously transmitted frequency domain symbols. The cyclic prefix has length v where v is greater than or equal to a duration of the impulse response of the overall channel and assures orthogonality of the frequency domain subchannels.

There are other known ways of simultaneously transmitting a burst of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels. The term frequency domain should be understood to refer to any domain that is divided into such orthogonal or substantially orthogonal subchannels.

Figure 1:
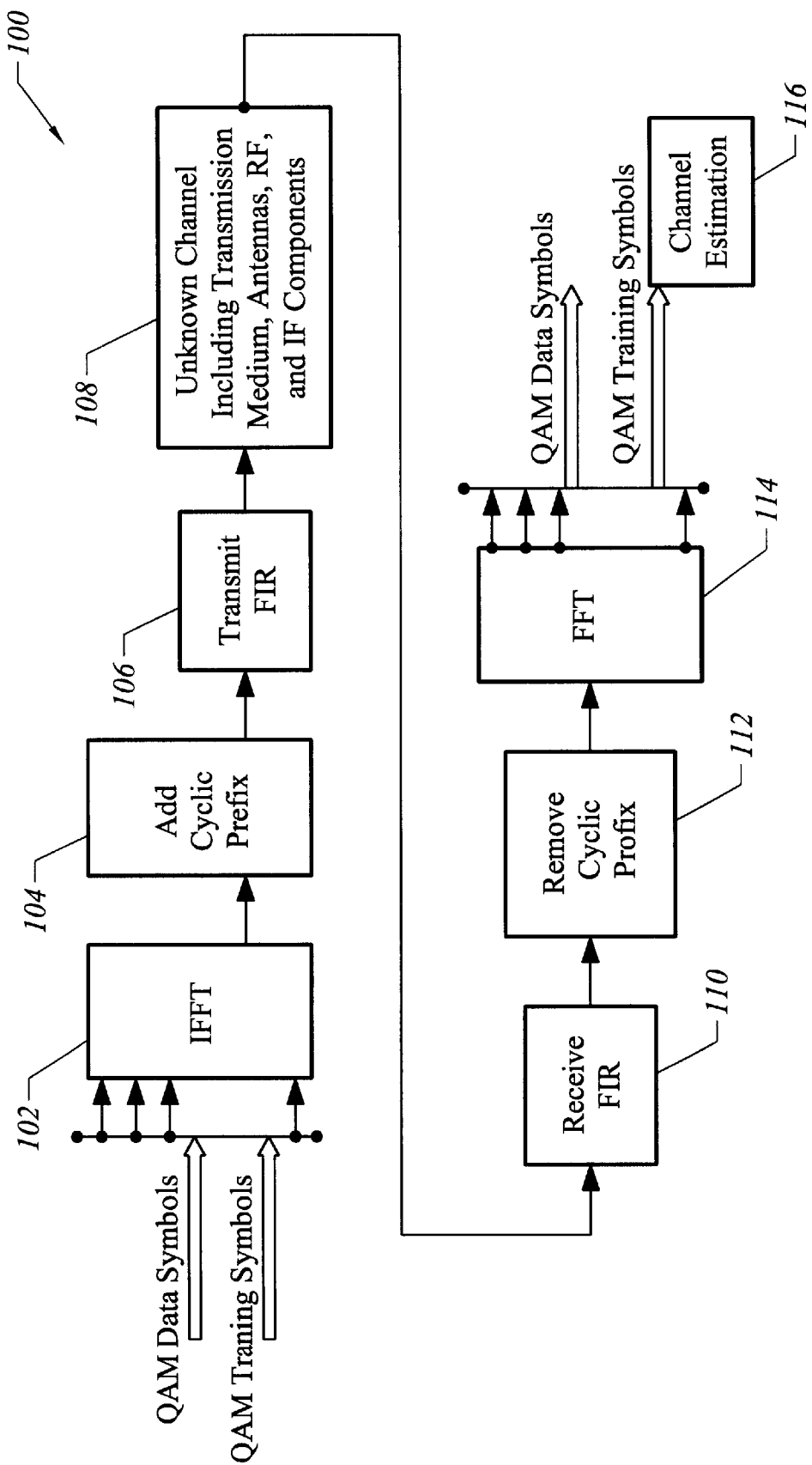
FIG. 1 depicts an OFDM communication system according to one embodiment of the present invention.

FIG. 1 depicts an OFDM communication system 100 according to one embodiment of the present invention. A mixture of data symbols and training symbols are input in parallel to an IFFT processing block 102. Prior to IFFT processing block 102, the data symbols and/or training symbols may be processed in various ways including coding, equalization, and bit loading to take into account capacity variations among subchannels, etc.

The training symbols have values which are known at the receiver end of the link and allow the receiver to estimate the characteristics of the channel. In some embodiments, the channel characteristic information is returned on another link to the transmitter end and used to refine any coding, equalization, bit loading, etc. done on the data symbols prior to IFFT processing block 102. The data symbols may carry payload data such as computer files, image data, voice data, channel training data, power control information, medium access control (MAC) information, etc.

A cyclic prefix processing block 104 adds the cyclic prefix discussed above. There may be further digital filtering provided in one embodiment by a transmit FIR (finite impulse response) filter 106. An unknown channel block 108 represents everything between transmit FIR 106 and a receive FIR 110 and is intended to encompass channel components having unknown characteristics. Unknown channel block 108 may include on the transmit end: upconversion circuitry, conversion of the digital symbol stream to an analog signal, analog filtering including SAW filters, other analog mixers and amplifiers, and a transmitter antenna if the transmission medium is wireless. Unknown channel block 108 also typically includes the transmission medium which may be, e.g., a wireless medium at any frequency, a wired medium such as CATV, twisted pair, optical fiber, etc. On the receive end, unknown channel block 108 may include a receiver antenna for wireless media, a low noise amplifier, analog filters including any SAW filters, downconversion circuitry, and conversion of an analog signal into a digital symbol stream.

A baseband time domain symbol stream is then the input to a receive FIR 110 or other digital filter system. A cyclic prefix removal block 112 removes the cyclic prefix from the output of receive FIR 110. An FFT processor 114 then recovers the frequency domain data and training symbols.

A channel estimation processor 116 receives the training symbols and characterizes the channel based on the received training symbols and knowledge of their values as transmitted. The channel as referred to herein includes the effects of all components between cyclic prefix processing blocks 104 and 112. The characteristics, e.g., frequency and/or time domain responses of the transmit FIR 106 and receive FIR 110 will typically be fixed by design and therefore known. There may be other components with known characteristics. By contrast, the frequency and/or time domain characteristics of the constituents of unknown channel block 108 are not known. In some embodiments, characteristics of antennas or analog components may be sufficiently stable and well understood to be considered to be "known." Channel estimation processor 116 may take advantage of the known characteristics of any components. Similarly if for some reason digital filtering characteristics are unknown, channel estimation processor 116 need not rely on these unknown characteristics but may estimate them based on the received training symbol values and whatever characteristics are in fact known.

The channel estimate formed by channel estimation processor 116 may be used as input to coding, equalization, or bit loading processing that is applied to the input QAM data symbols. If a channel estimate is used at the transmit end, it can be sent as data on a reverse link. Similarly on the receive end, the channel estimate may be used to perform equalization or as input to decoding systems. The processing steps used on either the transmit or receive ends may require a channel estimate or a channel estimate may enhance their effectiveness in improving link performance.

In one embodiment, multiple antennas (or other channel input/outputs) are used on either the transmitter or receiver end and the elements depicted in FIG. 1 relate to a channel coupling one transmit antenna and one receiver antenna. Part of the pre-processing and/or post-processing may be spatial processing where symbols are weighted among antennas. One such scheme for spatial processing is disclosed in WO 98/09385. This type of spatial processing may take advantage of channel estimates generated by channel estimation processor 116. Generating a channel estimate for a particular pair of transmitter and receiver antenna may require silencing other transmitter antennas for a burst that includes training symbols.

Channel Estimation Overview

According to the present invention, one may completely characterize the channel using a set, J, of $\mu$ training symbols in a single burst where p is greater than or equal to the duration of the impulse response of the unknown components of the channel. Typically, $\mu$ will be less than v, the overall response of the channel including both known and unknown components. Depending on how rapidly channel characteristics vary, it may not be necessary to characterize the channel in every burst. It is to be understood here that the duration of the impulse response does not include insignificant trailing components in the time domain.

Figure 2:
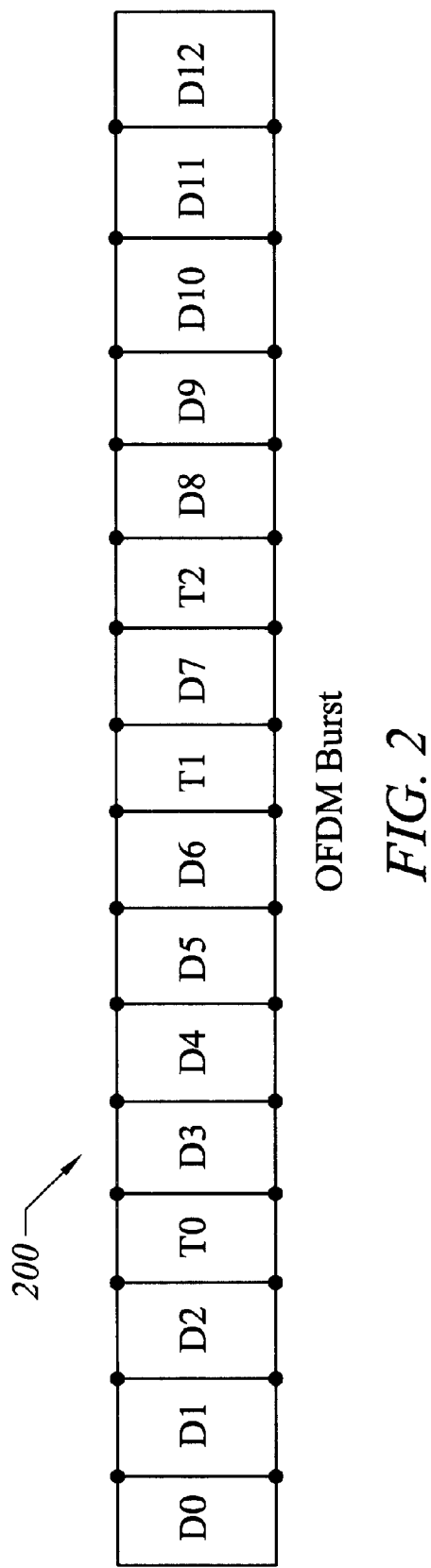
FIG. 2 depicts organization of a representative OFDM burst including training symbols according to one embodiment of the present invention.

FIG. 2 depicts organization of a representative OFDM burst 200 including training symbols according to one embodiment of the present invention. The layout of burst 200 assumes that IFFT processing block 102 performs a 16 point IFFT and FFT processor 114 performs a 16 point FFT. Burst 200 is depicted in the frequency domain. Data symbols are marked Dx and training symbols are marked Tx. In burst 200, three training symbols are used. Thus, the duration of the impulse response of the unknown channel components may be as long as three symbol periods.

Channel Estimation Procedure Details

A set J defines the frequency domain locations of the training symbols as depicted in e.g., FIG. 2. Let X be a vector of the received frequency domain symbols in a burst. Let Z be a vector of the transmitted frequency domain symbols in a burst. The transmitted training symbols (input to IFFT block 102) may be represented by a vector $Z_t$ composed of the training symbols, i.e., $Z(n \epsilon J)$. The received training symbols (output from FFT block 114 and input to channel estimation block 116) may be represented by a vector: $X_r = X(n \epsilon J)$. The relationship between the frequency-domain transmitted symbols (Z) and the frequency-domain received symbols (A) may be represented by:

$X(n) = H_C(n)Z(n) + V(n) = G_T(n)H(n)G_R(n)Z(n) + V(n)$, $\forall n$ positions in the burst, where $H_C$ is the overall frequency response of the communication channel including both known and unknown components;

H is the frequency response of the channel elements having unknown characteristics;

$G_T$ is the frequency response of the transmitter elements having known characteristics (e.g., transmit FIR 106);

$G_R$ is the frequency response of the receiver elements having known characteristics (e.g., receiver FIR 110);

V represents noise and interference; and n is a frequency domain index.

The relationship between the impulse response h of the unknown channel and the frequency response H at frequency n is represented by:

$$H(n) = Y(n,.) \begin{bmatrix} h \\ 0 \end{bmatrix} = Y(n, 1{:}\mu)h.$$

The impulse response h has duration $\mu < v$. The matrix Y(n,.) is the nth row of the well-known FFT matrix. The column vector $$\begin{bmatrix} h \\ 0 \end{bmatrix}$$

is the impulse response h padded by zeroes to the length of the IFFT implemented by IFFT block 102. The matrix $Y(n,1{:}\mu)$ is the nth row and first through lath columns of the well-known FFT matrix.

The unknown channel can then be characterized by solving for h in the expression:

$$\frac{X_t}{Z_t} = X(J) \div Z(J) = diag\{G_T(J) \times G_R(J)\}Y(J, 1{:}\mu)h + V'(J)$$

The ÷ operation here refers to an element by element division between vectors or matrices. The × operation refers to an element by element multiplication. There is a unique solution for h where $\mu < v$. $G_T(J)$ and $G_R(J)$ refer to vectors composed of elements of the frequency responses $G_T$ and $G_R$ corresponding to the positions of training symbols in the burst. We will now describe an efficient procedure for solving for h. $Y(J,1{:}v_h)$ refers to rows of the FFT matrix corresponding to the position of training symbols in the burst but only the first $\mu$ columns.

Figure 3:
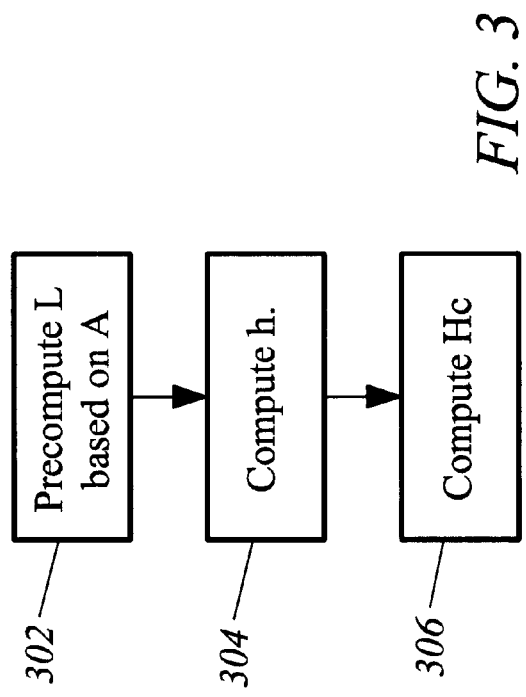
FIG. 3 is a flowchart describing steps of channel estimation according to one embodiment of the present invention.

FIG. 3 is a flowchart describing steps of channel estimation according to one embodiment of the present invention. At step 302, channel estimation processor 116 computes matrices A and L based on the frequency responses of the known channel components and the following expressions.

$A = diag\{G_T(J) \times G_R(J)\}Y(J,1{:}\mu)$ $L = (A^*A)^{-1}A^* \epsilon C^{\mu \times length(J)}$.

These expressions may be computed initially and not recomputed until a known channel component changes.

At step 304, channel estimation processor 116 estimates h to be:

$\hat{h} = L(X(J) \div Z(J))$.

Then, at step 306, channel estimation processor 116 estimates $H_C$ to be:

$\hat{H}_C(n) = G_R(n)G_T(n)Y(n,1{:}\mu)\hat{h}$.

In an alternative embodiment, at step 304, channel estimation processor 116 estimates h to be:

$\hat{h} = Y(J,1{:}\mu) \perp (X(J) \div Z(J) \div G_T(J) \div G_R(J))$. Step 306 is computed as above. This alternative embodiment does not estimate as accurately as the procedure of FIG. 3.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, all formulas given above are merely representative of procedures that may be used. For the flowchart of FIG. 3, steps may be added or deleted within the scope of the present invention. All publications, patents, and patent applications cited herein are hereby incorporated by reference.

What is claimed is:

1. In a digital communication system a method for characterizing a channel having known and unknown components, the method comprising:

receiving a time domain series of symbols via said channel;

converting said time domain series of symbols into a series of frequency domain symbols including exactly $\mu$ training symbols wherein $\mu$ is less than a duration of an impulse response of said channel in symbol periods; and processing said $\mu$ training symbols to characterize said unknown components of said channel, based on knowledge of said known components of said channel.

2. The method of claim 1 wherein $\mu$ is greater than or equal to the duration of an impulse response of said unknown component of said channel.

3. The method of claim 2 wherein converting comprises:

removing a cyclic prefix from said time domain series of symbols; and thereafter performing an FFT on said time domain series of symbols.

4. The method of claim 2 wherein processing comprises:

characterizing said known components of said channel;

characterizing said channel including both said known and unknown components based on said training symbols as obtained in said converting step and based on knowledge of transmitted values of said training symbols; and characterizing said unknown components of said channel based on results of characterizing said known components and results of characterizing said channel including both said known and unknown components.

5. The method of claim 4 wherein characterizing said known components of said channel comprises obtaining a frequency response of said known components of said channel at frequencies corresponding to frequencies of said training symbols.

6. The method of claim 5 wherein characterizing said channel comprises dividing values of said training symbols obtained in said converting step by known values of said training symbols as transmitted.

7. The method of claim 2 further comprising obtaining:
A=diag$\{G_T(J) \times G_R(J)\}$Y(J,1:$\mu$), where $G_T$ is a frequency response of transmitter elements having known characteristics, $G_R$ is a frequency response of receiver elements having known characteristics, the × operation refers to an element by element $\mu$ multiplication, and Y(J,1:$\mu$) represents rows corresponding to training symbol positions and first through $\mu$th columns of an FFT matrix.

8. The method of claim 7 further comprising obtaining:
L=$(A^*A)^{-1}A^* \epsilon C^{\mu \times length(J)}$.

9. The method of claim 8 wherein processing comprises estimating said unknown components of said channel to have a time domain response, $\hat{h}$=L(X(J)÷Z(J)) where ÷ signifies an element by element divide, X(J) represents said training symbols as received, and Z(J) represents known transmitted values of said training symbols.

10. The method of claim 9 further comprising:
estimating a frequency response of said channel including both said known and unknown components to be:
$\hat{H}_C(n)=G_R(n)G_T(n)Y(n,1:\mu)\hat{h}$.

11. The method of claim 2 wherein processing comprises estimating said unknown components of said channel to have a time domain response, $\hat{h}$=Y(J,1:$\mu$)$^{-1}$(X(J)÷Z(J)÷$G_T$(J)÷$G_R$(J)) where ÷ signifies an element by element divide, X(J) represents said training symbols as received, and Z(J) represents known transmitted values of said training symbols, $G_T$ is a frequency response of transmitter elements having known characteristics, $G_R$ is a frequency response of receiver elements having known characteristics, $G_T$(J) and $G_R$(J) refer to vectors composed of elements of $G_T$ and $G_R$ corresponding to positions of training symbols in said frequency domain series of symbols, and Y(J,1:$\mu$) represents rows corresponding to training symbol positions and first through $\mu$th columns of an FFT matrix.

12. The method of claim 2 further comprising:
repeating said receiving, converting, and processing steps for multiple channels.

13. The method of claim 12 wherein said multiple channels correspond to pairings of transmitter antenna and receiver antenna.

14. The method of claim 2 wherein said known components comprise digital filters.

15. A digital communication system that characterizes a channel having known and unknown components, said digital communication system comprising:
a receiver that receives a time domain series of symbols via said channel;
a frequency domain converter that converts said time domain series of symbols into a series of frequency domain symbols including exactly $\mu$ training symbols wherein $\mu$ is less than a duration of an impulse response of said channel in symbol periods; and
a channel estimation processor that processes said training symbols to characterize said unknown components of said channel.

16. The system of claim 15 wherein $\mu$ is greater than a duration of an impulse response of said unknown component of said channel.

17. The system of claim 16 wherein said converter:
removes a cyclic prefix from said time domain series of symbols; and thereafter performs an FFT on said time domain series of symbols.

18. The system of claim 16 wherein said channel estimation processor:
characterizes said known components of said channel;
characterizes said channel including both said known and unknown components based on said training symbols as obtained by said frequency domain converter and based on knowledge of transmitted values of said training symbols; and
characterizes said unknown components of said channel based on results of characterizing said known components and results of characterizing said channel including both said known and unknown components.

19. The system of claim 18 wherein said channel estimation processor characterizes said known components of said channel by obtaining a frequency response of said known components of said channel at frequencies corresponding to frequencies of said training symbols.

20. The system of claim 19 wherein said channel estimation processor characterizes said channel by dividing values of said training symbols obtained by said frequency domain converter by known values of said training symbols as transmitted.

21. The system of claim 18 wherein said channel estimation processor estimates said unknown components of said channel to have a time domain response, $\hat{h}$=Y(J,1:$\mu$)$^{-1}$(X(J)÷Z(J)÷$G_T$(J)÷$G_R$(J)) where ÷ signifies an element by element divide, X(J) represents said training symbols as received, Z(J) represents known transmitted values of said training symbols, $G_T$ is a frequency response of transmitter elements having known characteristics, $G_R$ is a frequency response of receiver elements having known characteristics, $G_T$(J) and $G_R$(J) refer to vectors composed of elements of $G_T$ and $G_R$ corresponding to positions of training symbols in said frequency domain series of symbols and Y(J,1:$\mu$) represents rows corresponding to training symbol positions and first through $\mu$th columns of an FFT matrix.

22. The system of claim 18 wherein said frequency domain converter and channel estimation processor are repeatedly invoked for multiple channels.

23. The system of claim 22 wherein said multiple channels correspond to pairings of transmitter antenna and receiver antenna.

24. The system of claim 16 wherein said known components comprise digital filters.

25. The system of claim 16 wherein said channel estimation processor further obtains:
A=diag$\{G_T(J) \times G_R(J)\}$Y(J,1:$\mu$), where $G_T$ is a frequency response of transmitter elements having known characteristics, $G_R$ is a frequency response of receiver elements having known characteristics, the × operation refers to an element by element $\mu$ multiplication, and Y(J,1:$\mu$) represents rows corresponding to training symbol positions and first through $\mu$th columns of an FFT matrix.

26. The system of claim 25 wherein said channel estimation processor further obtains:
L=$(A^*A)^{-1}A^* \epsilon C^{\mu \times length(J)}$.

27. The system of claim 26 wherein said channel estimation processor estimates said unknown components of said channel to have a time domain response, $\hat{h}$=L(X(J)÷Z(J)) where ÷ signifies an element by element divide, X(J) represents said training symbols as received, and Z(J) represents known transmitted values of said training symbols.

28. The system of claim 27 wherein said channel estimation processor estimates a frequency response of said channel including both said known and unknown components to be: $\hat{H}_C(n)=G_R(n)G_T(n)Y(n,1:\mu)\hat{h}$.

29. A digital communication system comprising:
a transmitter that transmits OFDM symbols in successive bursts wherein at least one burst includes exactly $\mu$ training symbols wherein $\mu$ is less than a duration of an impulse response of said channel in symbol periods;
a receiver coupled to said transmitter via a channel comprising both known and unknown components; and
said receiver comprising a channel estimation processor that receives said training symbols and processes said training symbols to characterize said unknown components of said channel based on said known components.

30. In a digital communication system, apparatus for characterizing a channel having known and unknown components, said apparatus comprising:
means for receiving a time domain series of symbols via said channel;
means for converting said time domain series of symbols into a series of frequency domain symbols including exactly $\mu$ training symbols wherein $\mu$ is less than a duration of an impulse response of said channel in symbol periods; and
means for processing said $\mu$ training symbols to characterize said unknown components of said channel, based on knowledge of said known components of said channel.

31. The apparatus of claim 30 wherein $\mu$ is greater than or equal to the duration of an impulse response of said unknown component of said channel.

32. The apparatus of claim 31 wherein said means for converting comprises:
means for removing a cyclic prefix from said time domain series of symbols; and
means for performing an FFT on said time domain series of symbols.

33. The apparatus of claim 31 wherein said means for processing comprises:
means for characterizing said known components of said channel;
means for characterizing said channel including both said known and unknown components based on said training symbols as obtained by said converting means and based on knowledge of transmitted values of said training symbols; and
means for characterizing said unknown components of said channel based on results of characterizing said known components and results of characterizing said channel including both said known and unknown components.

34. The apparatus of claim 33 wherein said means for characterizing said known components of said channel comprises means for obtaining a frequency response of said known components of said channel at frequencies corresponding to frequencies of said training symbols.

35. The apparatus of claim 34 wherein said means for characterizing said channel comprises means for dividing values of said training symbols obtained by said converting means by known values of said training symbols as transmitted.

36. The apparatus of claim 31 further comprising means for obtaining:
$A=\mathrm{diag}\{G_T(J)\times G_R(J)\}Y(J,1:\mu)$, where $G_T$ is a frequency response of transmitter elements having known characteristics, $G_R$ is a frequency response of receiver elements having known characteristics, the × operation refers to an element by element $\mu$ multiplication, and $Y(J,1:\mu)$ represents rows corresponding to training symbol positions and first through $\mu$th columns of an FFT matrix.

37. The apparatus of claim 36 further comprising means for obtaining:
$L=(A^*A)^{-1}A^*\epsilon C^{\mu\times length(J)}$.

38. The apparatus of claim 37 wherein said means for processing comprises means for estimating said unknown components of said channel to have a time domain response, $\hat{h}=L(X(J)\div Z(J))$ where ÷ signifies an element by element divide, $X(J)$ represents said training symbols as received, and $Z(J)$ represents known transmitted values of said training symbols.

39. The apparatus of claim 38 further comprising:
means for estimating a frequency response of said channel including both said known and said unknown components to be: $\hat{H}_C(n)=G_R(n)G_T(n)Y(n,1:\mu)\hat{h}$.

40. The apparatus of claim 31 wherein said means for processing comprises means for estimating said unknown components of said channel to have a time domain response, $\hat{h}=Y(J,1:\mu)^{-1}(X(J)\div Z(J)\div G_T(J)\div G_R(J))$ where ÷ signifies an element by element divide, $X(J)$ represents said training symbols as received, and $Z(J)$ represents known transmitted values of said training symbols, $G_T$ is a frequency response of transmitter elements having known characteristics, $G_R$ is a frequency response of receiver elements having known characteristics, $G_T(J)$ and $G_R(J)$ refer to vectors composed of elements of $G_T$ and $G_R$ corresponding to positions of training symbols in said frequency domain series of symbols, and $Y(J,1:\mu)$ represents rows corresponding to training symbol positions and first through $\mu$th columns of an FFT matrix.

* * * * *